(12) United States Patent
Kim et al.

(10) Patent No.: US 10,077,043 B2
(45) Date of Patent: Sep. 18, 2018

(54) METHOD AND APPARATUS FOR CONTROLLING MILD HYBRID ELECTRIC VEHICLE

(71) Applicant: HYUNDAI MOTOR COMPANY, Seoul (KR)

(72) Inventors: Hyun Kim, Hwaseong-si (KR); Ki Hong Kang, Gwangmyeong-si (KR); Sung Il You, Gwacheon-si (KR); Hwa Yong Jang, Hwaseong-si (KR); Yong Ug Kim, Anyang-si (KR); YoungMin Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 14 days.

(21) Appl. No.: 15/351,958

(22) Filed: Nov. 15, 2016

(65) Prior Publication Data
US 2017/0305409 A1    Oct. 26, 2017

(30) Foreign Application Priority Data
Apr. 25, 2016    (KR) .......................... 10-2016-0050345

(51) Int. Cl.
*B60W 10/08*    (2006.01)
*B60W 20/15*    (2016.01)
(Continued)

(52) U.S. Cl.
CPC ............ *B60W 20/15* (2016.01); *B60W 10/06* (2013.01); *B60W 10/08* (2013.01);
(Continued)

(58) Field of Classification Search
CPC ...... B60W 20/14; B60W 30/02; B60W 20/10; B60W 20/15; B60L 11/1809;
(Continued)

(56) References Cited

U.S. PATENT DOCUMENTS 8,002,058 B2 *  8/2011  Ishikawa ............... B60W 30/02
                                                        180/65.21
8,332,116 B2 * 12/2012  Takiguchi ............ B60K 26/021
                                                        180/65.265
(Continued)

FOREIGN PATENT DOCUMENTS

JP        10-23609 A     1/1998
JP     2000-130204 A     5/2000
(Continued)

OTHER PUBLICATIONS

Fayazi et al., Power delivery co-ordination to meet driver's demand in a mild hybrid vehicle with automated manual transmission, 2008, IEEE, p. 327-332 (Year: 2008).*

(Continued)

*Primary Examiner* — McDieunel Marc
(74) *Attorney, Agent, or Firm* — McDermott Will & Emery LLP

(57) ABSTRACT

A method for controlling a mild hybrid electric vehicle includes steps of: detecting data regarding the mild hybrid electric vehicle; determining a target torque of an engine according to the detected data; determining whether knocking of the engine occurs according to the detected data; determining a retardation amount of an ignition timing when it is determined that the knocking occurs; comparing the retardation amount of the ignition timing with a value; determining a loss amount of a combustion torque of the engine according to the retardation amount of the ignition timing when the retardation amount of the ignition timing is equal to or greater than the value; determining a target torque of a mild hybrid starter & generator (MHSG) according to the target torque of the engine and the loss amount of the combustion torque of the engine; and operating the MHSG to generate the target torque of the MHSG.

11 Claims, 3 Drawing Sheets

(51) Int. Cl.
*B60W 30/188* (2012.01)
*B60W 10/06* (2006.01)

(52) U.S. Cl.
CPC ... *B60W 30/188* (2013.01); *B60W 2510/0628* (2013.01); *B60W 2510/0638* (2013.01); *B60W 2540/10* (2013.01); *B60W 2710/0666* (2013.01); *B60W 2710/083* (2013.01); *B60Y 2200/92* (2013.01); *Y10S 903/902* (2013.01)

(58) Field of Classification Search
CPC .. B60L 11/1862; B60L 2250/16; B60T 8/172; B60T 11/10; B60T 2270/60; B60Y 2300/18125; B60Y 2300/91; B60Y 2400/112; B60Y 2400/81; Y10S 903/947; B60K 6/445; B60K 6/485; F02D 41/065
USPC .......................................................... 701/22
See application file for complete search history.

(56) References Cited

U.S. PATENT DOCUMENTS

| | | | | |
|---|---|---|---|---|
| 8,880,254 B2 * | 11/2014 | Choi | ................... | B60W 30/192 123/375 |
| 9,132,831 B2 * | 9/2015 | Hoshiba | ................. | B60K 6/445 |
| 9,216,639 B2 * | 12/2015 | Yamamoto | ............ | F02D 41/065 |
| 9,481,363 B2 * | 11/2016 | Poertner | ................ | B60K 6/485 |
| 2017/0158185 A1 * | 6/2017 | Kim | ........................ | B60K 25/02 |
| 2017/0291594 A1 * | 10/2017 | Kim | ...................... | B60W 20/10 |
| 2017/0305409 A1 * | 10/2017 | Kim | ...................... | B60W 20/15 |

FOREIGN PATENT DOCUMENTS

| | | |
|---|---|---|
| JP | 2006-307764 A | 11/2006 |
| KR | 10-2012-0059686 A | 6/2012 |

OTHER PUBLICATIONS

Liang et al., Study of the electronic control strategy for the power train of hybrid electric vehicle, 1999, IEEE, p. 383-386 (Year: 1999).*

Cikanek et al., Regenerative braking system for a hybrid electric vehicle, 2002, IEEE, p. 3129-3134 (Year: 2002).*

Shuang et al., Power Management Strategy with Regenerative Braking for Fuel Cell Hybrid Electric Vehicle, 2009, IEEE, p. 1-4 ( Year: 2009).*

* cited by examiner

METHOD AND APPARATUS FOR CONTROLLING MILD HYBRID ELECTRIC VEHICLE

CROSS-REFERENCE TO RELATED APPLICATION

This application claims the benefit of priority to Korean Patent Application No. 10-2016-0050345, filed in the Korean Intellectual Property Office on Apr. 25, 2016, the entirety of which is incorporated herein by reference.

TECHNICAL FIELD

The present disclosure relates to a method and an apparatus for controlling a mild hybrid electric vehicle.

BACKGROUND

As is generally known in the art, a hybrid electric vehicle uses both an internal combustion engine and a battery power source. The hybrid electric vehicle efficiently combines the torque of the internal combustion engine and the torque of a motor.

Hybrid electric vehicles may be categorized as either a hard type or a mild type according to a power sharing ratio between the engine and the motor. In the case of the mild type of hybrid electric vehicle (hereinafter referred to as a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved.

In general, the efficiency of a gasoline engine can be improved by operating the engine with a high compression ratio or by reducing the size of the engine. If the engine is operated with a high compression ratio or the size of the engine is reduced, however, knocking may occur and knocking may deteriorate the performance of the engine.

At the end of a combustion stroke, the pressure and temperature at an end-gas zone in a combustion chamber may increase and fuel may be self-ignited. Thus, knocking may occur due to the self-ignition of the fuel. If knocking occurs, the fuel is burned quickly and a piston may be damaged by vibrations. In addition, since combustion pressure is quickly lowered after reaching maximum pressure, the performance of the engine may be deteriorated.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a method and an apparatus for controlling a mild hybrid electric vehicle having advantages of preventing deterioration of power performance of the mild hybrid electric vehicle by using a mild hybrid starter & generator (MHSG) even though knocking occurs.

According to an exemplary embodiment in the present disclosure, a method for controlling a mild hybrid electric vehicle includes steps of: detecting data regarding the mild hybrid electric vehicle; determining a target torque of an engine according to the detected data; determining whether knocking of the engine occurs according to the detected data; determining a retardation amount of an ignition timing when it is determined that the knocking occurs; comparing the retardation amount of the ignition timing with a value; determining a loss amount of a combustion torque of the engine according to the retardation amount of the ignition timing when the retardation amount of the ignition timing is equal to or greater than the value; determining a target torque of a mild hybrid starter & generator (MHSG) according to the target torque of the engine and the loss amount of the combustion torque of the engine; and operating the MHSG to generate the target torque of the MHSG.

The target torque of the engine may be determined based on a position value of an accelerator pedal, a speed of the mild hybrid electric vehicle, and a speed of the engine.

The loss amount of the combustion torque of the engine may be determined based on the retardation amount of the ignition timing, a speed of the engine, an air amount, a fuel amount, and an air/fuel ratio.

The method may further include a step of comparing the target torque of the MHSG with an available torque of the MHSG.

The step of operating the MHSG to generate the target torque of the MHSG may be performed when the target torque of the MHSG is equal to or less than the available torque of the MHSG.

The method may further include a step of operating the MHSG to generate the available torque of the MHSG when the target torque of the MHSG is greater than the available torque of the MHSG.

According to another exemplary embodiment in the present disclosure, an apparatus for controlling a mild hybrid electric vehicle comprises: an engine; a mild hybrid starter & generator configured to start the engine and to generate electricity according to an output of the engine; a data detector configured to detect data for controlling the mild hybrid electric vehicle; and a controller configured to determine a target torque of the engine and determine whether knocking of the engine occurs based on the detected data. The controller determines a retardation amount of an ignition timing when it is determined that the knocking occurs, determines a loss amount of a combustion torque of the engine based on the retardation amount of the ignition timing when the retardation amount of the ignition timing is equal to or greater than a value, determines a target torque of the MHSG according to the target torque of the engine and the loss amount of the combustion torque of the engine, and operates the MHSG to generate the target torque of the MHSG.

The controller may determine the target torque of the engine according to a position value of an accelerator pedal, a speed of the mild hybrid electric vehicle, and a speed of the engine.

The controller may determine the loss amount of the combustion torque of the engine according to the retardation amount of the ignition timing, a speed of the engine, an air amount, a fuel amount, and an air/fuel ratio.

When the target torque of the MHSG is greater than an available torque of the MHSG, the controller may operate the MHSG to generate the available torque of the MHSG.

The data detector may include: a knock sensor configured to detect vibrations occurring in a combustion process; an accelerator pedal position sensor configured to detect a position value of an accelerator pedal; a vehicle speed sensor configured to detect a speed of the mild hybrid electric vehicle; an engine speed sensor configured to detect a speed of the engine; an air amount sensor configured to detect an amount of air flowing into the engine; and an SOC sensor configured to detect a state of charge of a battery.

According to an exemplary embodiment in the present disclosure, even though knocking occurs, power performance of the mild hybrid electric vehicle may be prevented from being deteriorated by using the MHSG.

DETAILED DESCRIPTION OF THE EMBODIMENTS

Figure 1:
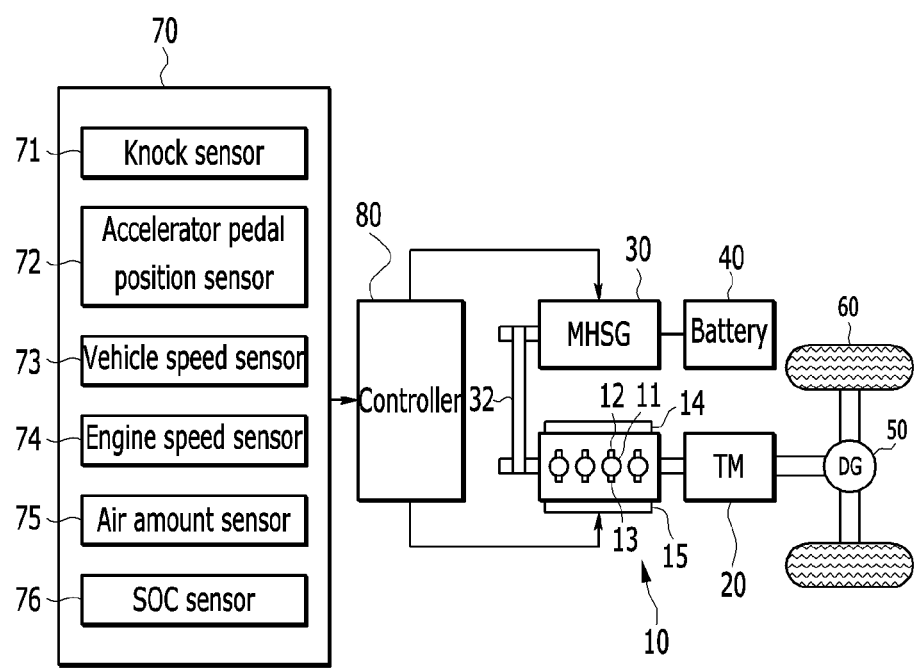
FIG. 1 is a block diagram of a mild hybrid electric vehicle according to an exemplary embodiment in the present disclosure.

In the following detailed description, the present disclosure will be described more fully with reference to the accompanying drawings, in which exemplary embodiments are shown. However, the present disclosure is not limited the exemplary embodiments which are described herein, and may be modified in various different ways.

Parts which are not related with the description are omitted for clearly describing the exemplary embodiments, and like reference numerals refer to like or similar elements throughout the specification.

Since each component in the drawings is arbitrarily illustrated for easy description, the present disclosure is not particularly limited to the components illustrated in the drawings.

FIG. 1 is a block diagram of a mild hybrid electric vehicle according to an exemplary embodiment in the present disclosure.

As shown in FIG. 1, a mild hybrid electric vehicle according to the present exemplary embodiment may include an engine 10, a transmission 20, a mild hybrid starter & generator (MHSG) 30, a battery 40, a differential gear apparatus 50, a wheel 60, a data detector 70, and a controller 80.

The engine 10 burns fuel and air to convert chemical energy into mechanical energy. The engine 10 may include a plurality of combustion chambers 11 into which fuel and air flow, an ignition device 12 igniting the fuel and air flowing into the combustion chamber 12, and an injector 13 injecting the fuel. The engine 10 may be connected to an intake manifold 14 so as to receive the air in the combustion chamber 11, and exhaust gas generated in the combustion process may be gathered in an exhaust manifold 15 and exhausted to the exterior of the engine 10. The injector 13 may be mounted in the combustion chamber 11 or the intake manifold 14.

In connection with torque transmission of the mild hybrid electric vehicle, torque generated from the engine 10 is transmitted to an input shaft of the transmission 20, and torque output from an output shaft of the transmission 20 is transmitted to an axle via the differential gear apparatus 50. The axle rotates the wheel 60 such that the mild hybrid electric vehicle runs by the torque generated from the engine 10.

The MHSG 30 converts electrical energy into mechanical energy or converts mechanical energy into electrical energy. In other words, the MHSG 30 starts the engine 10 or generates electricity according to an output of the engine 10. In addition, the MHSG 30 may assist the torque of the engine 10. The torque generated by the engine 10 may be used as the main torque, and torque generated by the MHSG 30 may be used as auxiliary torque. The engine 10 and the MHSG 30 may be connected to each other through a belt 32.

The battery 40 may supply electricity to the MHSG 30, and may be charged through electricity recovered through the MHSG 30 in a regenerative braking mode. The battery 40 may be a 48 V battery. The mild hybrid electric vehicle may further include a low voltage DC-DC converter (LDC) converting a voltage supplied from the battery 40 into a low voltage, and a 12 V battery supplying a low voltage to electrical loads (e.g., a headlamp, an air conditioner, and a wiper).

The data detector 70 may detect data for controlling the mild hybrid electric vehicle, and the data detected by the data detector 70 may be transmitted to the controller 80. The data detector 70 may include a knock sensor 71, an accelerator pedal position sensor 72, a vehicle speed sensor 73, an engine speed sensor 74, an air amount sensor 75, and a state of charge (SOC) sensor 76. The data detector 70 may further include other detectors (e.g., a brake pedal position detector, a coolant temperature detector, and so on) for controlling the mild hybrid electric vehicle.

The knock sensor 71 detects vibrations occurring in the combustion process, and transmits a signal corresponding thereto to the controller 80. The knock sensor 71 may be mounted at a cylinder block and may include a piezoelectric element.

The accelerator pedal position sensor 72 detects a position value of an accelerator pedal (i.e., a pushed degree of the accelerator pedal), and transmits a signal corresponding thereto to the controller 80. When the accelerator pedal is pushed fully, the position value of the accelerator pedal is 100%, and when the accelerator pedal is not pushed, the position value of the accelerator pedal is 0%.

The vehicle speed sensor 73 detects a speed of the mild hybrid electric vehicle, and transmits a signal corresponding thereto to the controller 80.

The engine speed sensor 74 detects a speed of the engine 10, and transmits a signal corresponding thereto to the controller 80. The engine speed sensor 74 may detect the speed of the engine 10 based on a phase change of a crankshaft.

The air amount sensor 75 detects an amount of air flowing into the engine 10, and transmits a signal corresponding thereto to the controller 80.

The SOC sensor 76 detects a state of charge (SOC) of the battery 40, and transmits a signal corresponding thereto to the controller 80. Instead of directly detecting the SOC of the battery 40, a current and a voltage of the battery 40 may be measured to estimate the SOC of the battery 40.

The controller 80 controls operations of the engine 10, the transmission, 20, and the MHSG 30 based on the data detected by the data detector 70. The controller 80 may determine a target torque of the engine 10 for running the mild hybrid electric vehicle based on the data, and may determine a combustion torque of the engine 10 and a target torque of the MHSG 30 to satisfy the target torque of the engine 10. For these purposes, the controller 80 may be implemented with one or more processors executing a program. The program may include a series of commands for performing each step included in a method for controlling a mild hybrid electric vehicle according to an exemplary embodiment in the present disclosure to be described below.

Figure 2:
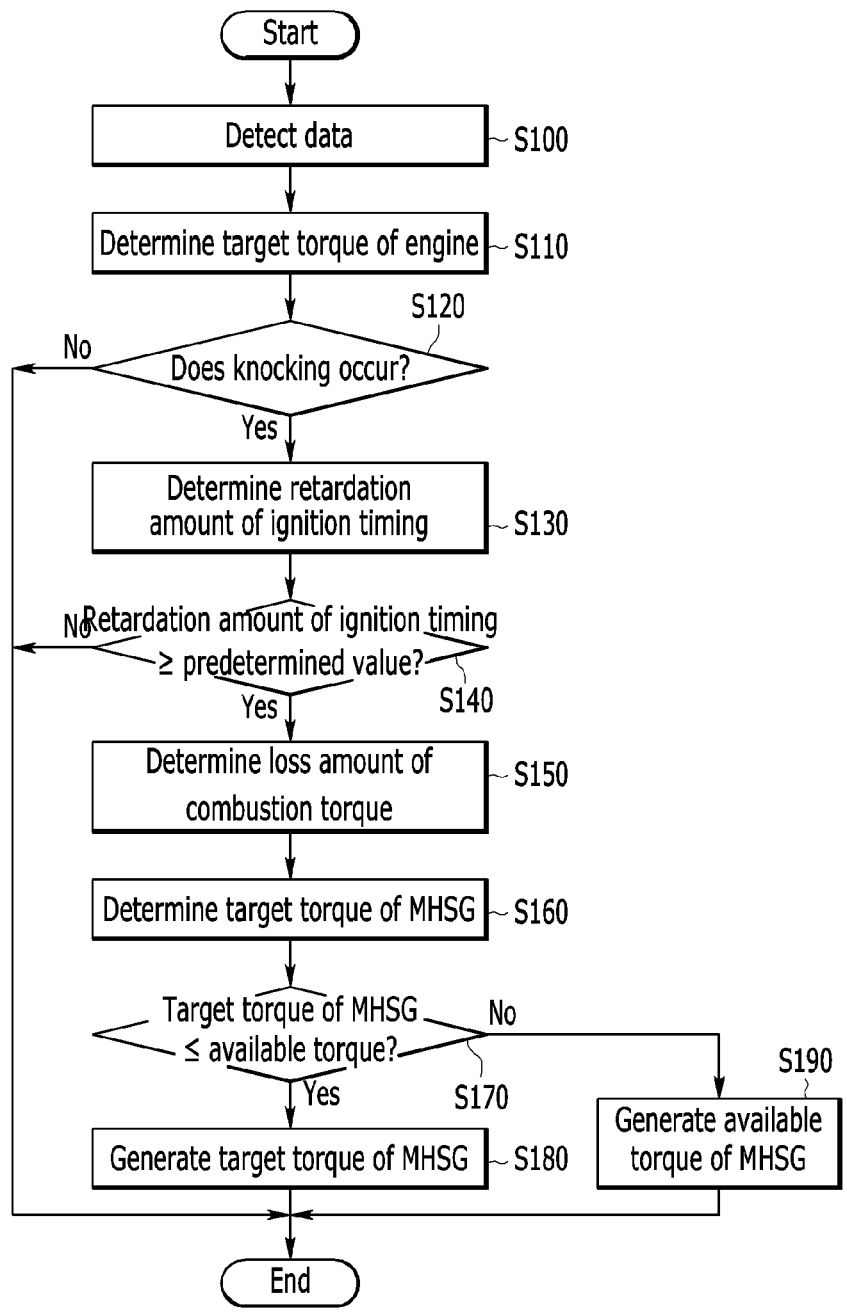
FIG. 2 is a flowchart of a method for controlling a mild hybrid electric vehicle according to an exemplary embodiment in the present disclosure.
Figure 3:
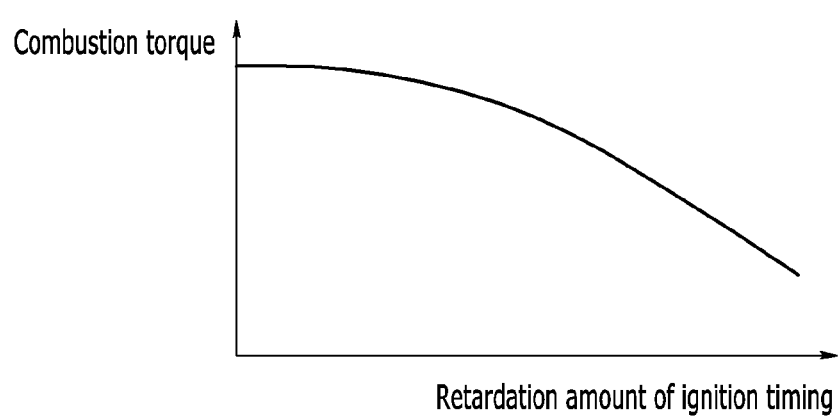
FIG. 3 is a graph illustrating a relationship between a retardation amount of ignition timing and a combustion torque of an engine according to an exemplary embodiment in the present disclosure.

FIG. 2 is a flowchart for a method for controlling a mild hybrid electric vehicle according to an exemplary embodiment in the present disclosure, and FIG. 3 is a graph illustrating a relationship between a retardation amount of ignition timing and a combustion torque of an engine according to an exemplary embodiment in the present disclosure.

As shown in FIG. 2, a method for controlling a mild hybrid electric vehicle according to the present exemplary embodiment may begin with detecting data for controlling the mild hybrid electric vehicle at step S100. In other words, the knock sensor 71 detects vibrations occurring in the combustion process, the accelerator pedal position sensor 72 detects the position value of the accelerator pedal, the vehicle speed sensor 73 detects the speed of the mild hybrid electric vehicle, the engine speed sensor 74 detects the speed of the engine 10, the air amount sensor 75 detects the amount of the air flowing into the engine 10, and the SOC sensor 76 detects the SOC of the battery 40.

The controller 80 determines the target torque of the engine 10 at step S110. The controller 80 may determine the target torque of the engine 10 based on the position value of the accelerator pedal, the speed of the mild hybrid electric vehicle, and the speed of the engine 10. The controller 80 may determine the target torque of the engine 10 further considering drivability (acceleration performance) of the mild hybrid electric vehicle and torque loss due to loads such as through the belt 32 and the air conditioner. The controller 80 may determine the combustion torque of the engine 10 and the target torque of the MHSG 30 to satisfy the target torque of the engine 10. The controller 80 may control ignition timing, an air amount, a fuel amount, and an air/fuel ratio to generate the combustion torque of the engine 10.

The controller 80 determines whether knocking of the engine 10 occurs at step S120. The controller 80 may determine that the knocking of the engine 10 occurs when a vibration amount occurring in the combustion process is equal to or greater than a predetermined vibration amount based on the signal of the knock sensor 71.

When the controller 80 determines that the knocking of the engine 10 does not occur at step S120, the controller 80 may terminate the method for controlling the mild hybrid electric vehicle according to the present exemplary embodiment. In this case, the controller 80 may control the operations of the engine 10 and the MHSG 30 based on the determined combustion torque of the engine 10 and the target torque of the MHSG 30.

When the controller 80 determines that the knocking of the engine 10 occurs at step S120, the controller 80 determines a retardation amount of the ignition timing at step S130. Generally, optimum ignition timing is advanced by a predetermined angle with respect to a rotation angle of the crankshaft when a piston is at top dead center (TDC). When the controller 80 determines that the knocking of the engine 10 occurs, the controller 80 may retard the ignition timing to prevent occurrence of the knocking. The controller 80 may determine the retardation amount of the ignition timing based on the vibration amount occurring in the combustion process.

The controller 80 may compare the retardation amount of the ignition timing with a predetermined value at step S140. The predetermined value may be set by experiments. In detail, the predetermined value may be set by a person of ordinary skill in the art based on a retardation amount of ignition timing influencing torque of the engine 10. As shown in FIG. 3, as the retardation amount of the ignition timing increases, a combustion torque of the engine 10 becomes less than the combustion torque of the engine 10 at the optimum ignition timing.

When the retardation amount of the ignition timing is less than the predetermined value at step S140, the controller 80 may terminate the method for controlling the mild hybrid electric vehicle according to the present exemplary embodiment. In this case, the controller 80 may control the engine 10 and the MHSG 30 based on the determined combustion torque of the engine 10 and the target torque of the MHSG 30.

When the retardation amount of the ignition timing is equal to or greater than the predetermined value at step S140, the controller 80 determines a loss amount of the combustion torque of the engine 10 based on the retardation amount of the ignition timing at step S150. The controller 80 may calculate the loss amount of the combustion torque of the engine 10 by using the retardation amount of the ignition timing, the speed of the engine 10, the air amount, the fuel amount, and the fuel/air ratio.

The controller 80 determines the target torque of the MHSG 30 based on the target torque of the engine 10 and the loss amount of the combustion torque of the engine 10 at step S160. The controller 80 determines the target torque of the MHSG 30 so that torque of the MHSG 30 is increased by the loss amount of the combustion torque of the engine 10 to satisfy the target torque of the engine 10.

The controller 80 may compare the target torque of the MHSG 30 with an available torque of the MHSG 30 at step S170. The available torque of the MHSG 30 is maximum generable torque that can be generated by the MHSG 30 in the current state, and may be calculated based on the SOC of the battery 40.

When the target torque of the MHSG 30 is equal to or less than the available torque of the MHSG 30 at step S170, the controller 80 operates the MHSG 30 to generate the target torque of the MHSG 30 at step S180. In this case, the combustion torque of the engine 10 is a value obtained by subtracting the target torque of the MHSG 30 from the target torque of the engine 10, and the controller 80 operates the engine 10 to generate the combustion torque of the engine 10. As a result, even though the knocking occurs, the target torque of the engine 10 may be satisfied.

When the target torque of the MHSG 30 is greater than the available torque of the MHSG 30 at step S170, the controller 80 may operate the MHSG 30 to generate the available torque of the MHSG 30 at step S190. In this case, the target torque of the engine 10 may not be satisfied to prevent the occurrence of the knocking (i.e., the output of the engine 10 is decreased), but it is possible to prevent the output of the engine from being largely decreased.

As described above, in accordance with an exemplary embodiment in the present disclosure, even though knocking occurs, power performance of the mild hybrid electric vehicle may be prevented from being deteriorated by using the MHSG 30.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a mild hybrid electric vehicle, comprising steps of:
    detecting data regarding the mild hybrid electric vehicle;
    determining, by a processor, a target torque of an engine according to the detected data;
    determining, by a processor, whether knocking of the engine occurs according to the detected data;
    determining, by a processor, a retardation amount of an ignition timing when the processor determines that the knocking occurs;
    comparing, by the processor, the retardation amount of the ignition timing with a value;
    determining, by the processor, a loss amount of a combustion torque of the engine according to the retardation amount of the ignition timing when the retardation amount of the ignition timing is equal to or greater than the value;
    determining, by the processor, a target torque of a mild hybrid starter & generator (MHSG) according to the target torque of the engine and the loss amount of the combustion torque of the engine; and
    operating the MHSG to generate the target torque of the MHSG.

2. The method of claim 1, wherein the target torque of the engine is determined according to a position value of an accelerator pedal, a speed of the mild hybrid electric vehicle, and a speed of the engine.

3. The method of claim 1, wherein the loss amount of the combustion torque of the engine is determined according to the retardation amount of the ignition timing, a speed of the engine, an air amount, a fuel amount, and an air/fuel ratio.

4. The method of claim 1, further comprising a step of comparing the target torque of the MHSG with an available torque of the MHSG.

5. The method of claim 4, wherein the step of operating the MHSG to generate the target torque of the MHSG is performed when the target torque of the MHSG is equal to or less than the available torque of the MHSG.

6. The method of claim 4, further comprising a step of operating the MHSG to generate the available torque of the MHSG when the target torque of the MHSG is greater than the available torque of the MHSG.

7. An apparatus for controlling a mild hybrid electric vehicle, comprising:
    an engine;
    a mild hybrid starter & generator configured to start the engine and to generate electricity according to an output of the engine;
    a data detector configured to detect data for controlling the mild hybrid electric vehicle; and
    a controller configured to determine a target torque of the engine and determine whether knocking of the engine occurs based on the detected data,
    wherein the controller determines a retardation amount of an ignition timing when it is determined that the knocking occurs,
    determines a loss amount of a combustion torque of the engine based on the retardation amount of the ignition timing when the retardation amount of the ignition timing is equal to or greater than a value,
    determines a target torque of the MHSG according to the target torque of the engine and the loss amount of the combustion torque of the engine, and
    operates the MHSG to generate the target torque of the MHSG.

8. The apparatus of claim 7, wherein the controller determines the target torque of the engine according to a position value of an accelerator pedal, a speed of the mild hybrid electric vehicle, and a speed of the engine.

9. The apparatus of claim 7, wherein the controller determines the loss amount of the combustion torque of the engine according to the retardation amount of the ignition timing, a speed of the engine, an air amount, a fuel amount, and an air/fuel ratio.

10. The apparatus of claim 7, wherein the controller operates the MHSG to generate torque of the MHSG when the target torque of the MHSG is greater than an available torque of the MHSG.

11. The apparatus of claim 7, wherein the data detector comprises:
    a knock sensor configured to detect vibrations occurring in a combustion process;
    an accelerator pedal position sensor configured to detect a position value of an accelerator pedal;
    a vehicle speed sensor configured to detect a speed of the mild hybrid electric vehicle;
    an engine speed sensor configured to detect a speed of the engine;
    an air amount sensor configured to detect an amount of air flowing into the engine; and
    an SOC sensor configured to detect a state charge of a battery.

* * * * *